UNITED STATES PATENT OFFICE 2,421,570.

INSECTICIDE

Frederick B. La Forge, Arlington, Va., assignor to United States of America, as represented by the Secretary of Agriculture No Drawing. Application October 4, 1944, Serial No. 557,215

8 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to insecticidal compositions containing pyrethrum and has for its object the provision of an improved composition of this type. This invention further relates to the synthesis of a new compound, namely, alpha-(3,4-methylenedioxyphenyl)tetrahydropyran, which is particularly useful when employed in conjunction with pyrethrins because of the resulting synergistic action, and also when employed as a solvent.

Insecticidal compositions containing pyrethrum are widely used to combat insect pests, such as flies, mosquitoes, gnats, and the like. Frequently, the pyrethrum is employed in a solvent of the hydrocarbon or mineral oil type, such as odorless kerosene, naphtha, and so forth. Also, it is employed in a solvent of liquefied gases, such as dichlorodifluoromethane, methyl chloride, and so forth. While these insecticidal compositions have good toxic properties and are well suited for the control of household insects and the like, they are expensive.

I have found that a new compound, namely, alpha-(3,4-methylenedioxyphenyl)tetrahydropyran, represented by Formula I,

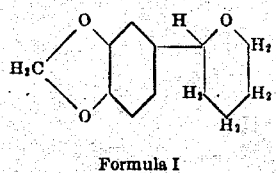

Formula I while possessing little or no insecticidal properties in itself, increases the toxicity of the pyrethrins to a decidedly advantageous extent. Thus I have found that alpha-(3,4-methylenedioxyphenyl)tetrahydropyran, when incorporated with the pyrethrins in an appropriate solvent, yields an insecticidal composition which is more effective against the ordinary housefly than can be accounted for on the basis of the pyrethrin and alpha-(3,4-methylenedioxyphenyl)tetrahydropyran content. Also, I have found that alpha-(3,4-methylenedioxyphenyl)tetrahydropyran is a good solvent for dichlorodiphenyltrichloroethanes, and in particular, DDT, which is known to be toxic to household insects, but which is insoluble in certain liquefied gases, such as dichlorodifluoromethane. This solvent action is so great that alpha-(3,4-methylenedioxyphenyl)tetrahydropyran may be used to keep dichlorodiphenyltrichloroethane in solution in the liquefied gas either with or without the pyrethrins depending on the purpose of the insecticide.

I prefer as the insecticidal composition a combination of alpha-(3,4-methylenedioxyphenyl)-tetrahydropyran and the pyrethrins in either odorless kerosene or dichlorodifluoromethane. However, I do not restrict my invention to this composition and the new insecticidal ingredients may be used in other solvents and in combination with other insecticides, such as organic thiocyanates, rotenone, derris, lonchocarpus, and the like.

Alpha-(3,4-methylenedioxyphenyl)tetrahydropyran, a new compound, may be prepared by the following procedure:

The sodium compound of beta-hydroxy-beta-(3,4-methylenedioxy-phenyl)acrylic ethyl ester (Formula II) is caused to react with trimethylenebromide, as illustrated below, to furnish the ethyl ester of 2,3-dihydro-6-(3,4-methylenedioxyphenyl)-1,4-pyran-5-carboxylic acid (Formula III):

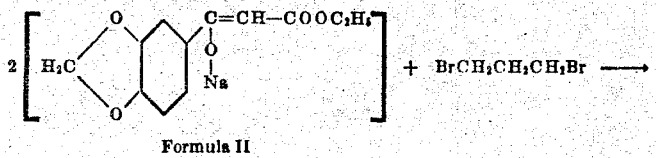

Formula II

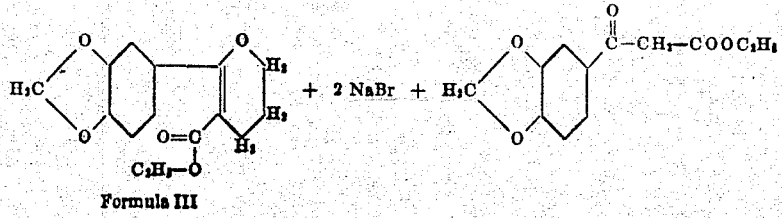

Formula III

The ester is saponified with ethanolic potassium hydroxide to the potassium salt of the corresponding acid which is obtained on addition of hydrochloric acid. The free acid, on heating, loses carbon dioxide to furnish 2,3-dihydro-6-(3,4-methylenedioxyphenyl)-1,4-pyran (Formula IV), which is

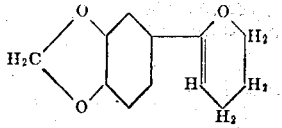

Formula IV

This is then reduced with hydrogen in the presence of a platinum catalyst in a conventional manner to alpha - (3,4-methylenedioxyphenyl) - tetrahydropyran as shown in Formula I.

Combustion analysis for carbon and hydrogen gave values of 69.36 percent for carbon and 6.85 percent for hydrogen which compares favorably with the theory of 69.89 percent and 6.85 percent, respectively. The refractive index at 26° C. for the yellow sodium line was found to be 1.5436 and the specific gravity at 26° C. was found to be 1.1774.

The efficiency of alpha-(3,4-methylenedioxyphenyl)tetrahydropyran is shown by the following results:

1. A refined kerosene solution of 1 percent of the above compound alone gave a 4 percent kill of houseflies in 48 hours.
2. A refined kerosene solution containing .05 percent of pyrethrins alone gave a kill of 17 percent in 48 hours.
3. A refined kerosene solution containing 1 percent of the above new compound and, in addition, .05 percent of pyrethrins gave a kill of 99 percent of the houseflies in 48 hours. It is thus obvious that a very small concentration of the compound which in itself is ineffective gives a pronounced increase in killing power of the diluted pyrethrin solution. This killing power is greater than that of the average commercial fly spray which contains twice the amount of pyrethrins used in the above test. The result is a considerable saving of pyrethrins.

The above example is by illustration only and the amount and proportion of alpha-(3,4-methylenedioxyphenyl)tetrahydropyran and of the pyrethrins may be varied over a wide range from 0.05 to 17 part by weight of pyrethrins, from 1 to 20 parts by weight of alpha-(3,4-methylenedioxyphenyl)tetrahydropyran, and from 98.95 to 79 parts by weight of kerosene.

Having thus described my invention. I claim:

1. An insecticidal composition comprising pyrethrum and alpha-(3,4-methylenedioxyphenyl)-tetrahydropyran as a synergist therefor.
2. An insecticidal composition comprising pyrethrum and alpha-(3,4-methylenedioxyphenyl)-tetrahydropyran as a synergist therefore is dissolved in a mutual solvent.
3. An insecticidal composition comprising pyrethrum and alpha-(3,4-methylenedioxyphenyl)-tetrahydropyran as a synergist therefor, dissolved in a mineral oil base.
4. An insecticidal composition comprising pyrethrum and alpha-(3,4-methylenedioxyphenyl)-tetrahydropyran as a synergist therefor, dissolved in dichlorodifluoromethane.
5. An insecticidal composition comprising from 0.05 to 1 part by weight of pyrethrins and from 1 to 20 parts by weight of alpha-(3,4-methylenedioxyphenyl)tetrahydropyran, dissolved in 98.95 to 79 parts by weight of kerosene.
6. An insecticidal composition comprising dichlorodiphenyltrichloroethane dissolved in alpha - (3,4 - methylenedioxyphenyl) tetrahydropyran.
7. An insecticidal composition comprising a solution of dichlorodiphenyltrichloroethane, alpha-(3,4-methylenedioxyphenyl)tetrahydropyran, and dichlorodifluoromethane.
8. An insecticidal composition comprising a solution of pyrethrum, alpha-(3,4-methylenedioxyphenyl)tetrahydropyran as a synergist therefor, dichlorodiphenyltrichloroethane and dichlorodifluoromethane.

FREDERICK B. LA FORGE.

REFERENCES CITED

The following references are of record in the file of this patent:

UNITED STATES PATENTS

| Number | Name | Date |
|---|---|---|
| 2,251,287 | Lott | Aug. 5, 1941 |
| 2,326,350 | Gertler et al. | Aug. 10, 1943 |